United States Patent
Sasaki

(10) Patent No.: US 7,038,748 B2
(45) Date of Patent: May 2, 2006

(54) REFLECTIVE LIQUID CRYSTAL DISPLAY AND METHOD OF ASSEMBLING THE SAME

(75) Inventor: Tsuyoshi Sasaki, Yokosuka (JP)

(73) Assignee: Victor Company of Japan, LTD, Kanagawa-Ken (JP)

( * ) Notice: Subject to any disclaimer, the term of this patent is extended or adjusted under 35 U.S.C. 154(b) by 23 days.

(21) Appl. No.: 10/846,640

(22) Filed: May 17, 2004

(65) Prior Publication Data

US 2005/0012877 A1    Jan. 20, 2005

(30) Foreign Application Priority Data

Jul. 16, 2003  (JP)  ............................. 2003-275164
Mar. 25, 2004  (JP)  ............................. 2004-088566

(51) Int. Cl.
*G02F 1/113*    (2006.01)
(52) U.S. Cl. ...................... 349/113; 349/114
(58) Field of Classification Search ............... 349/113, 349/114
See application file for complete search history.

(56) References Cited

U.S. PATENT DOCUMENTS

| 6,137,223 A * | 10/2000 | Hung et al. ................. 313/506 |
| 6,172,459 B1 * | 1/2001 | Hung et al. ................. 313/506 |
| 2004/0004686 A1 * | 1/2004 | Ogawa et al. .............. 349/114 |

FOREIGN PATENT DOCUMENTS

| JP | 09-269482 | 10/1997 |
| JP | 2002-365664 | 12/2002 |

* cited by examiner

*Primary Examiner*—James A. Dudek
(74) *Attorney, Agent, or Firm*—Jacobson Holman PLLC

(57) ABSTRACT

A reflective liquid crystal display has a transparent electrode, a reflective pixel electrode provided as facing the transparent electrode with a gap, and a liquid crystal layer provided in the gap between the transparent electrode and the reflective pixel electrode. A work-function adjusting layer is provided in the gap and on the reflective pixel electrode. The entire work function of the work-function adjusting layer and the reflective pixel electrode is adjusted within ±2% of a work function of the transparent electrode. Instead of the work-function adjusting layer, the transparent electrode may be made of a material containing a specific metal so that the transparent electrode exhibits a work function within ±2% of a work function of the reflective pixel electrode.

13 Claims, 3 Drawing Sheets

REFLECTIVE LIQUID CRYSTAL DISPLAY AND METHOD OF ASSEMBLING THE SAME

BACKGROUND OF THE INVENTION

The present invention relates to a reflective liquid crystal display with little flicker and screen burn-in for high picture quality and a method of assembling the reflective liquid crystal display.

Thanks to compactness and low power consumption compared to cathode ray tubes (SRT), liquid crystal display have often been used in office automation (OA) equipment, such as, notebook computers, personal data assists (PDA) and word processors, and also mobile phones.

A known reflective liquid crystal display is disclosed in Japanese Unexamined Patent publication No. 09 (1997)-269482.

The known liquid crystal display is equipped with: a multiple number of TFTs (Thin Film Transistors) arranged in a matrix on a substrate made of a conductive material, via an insulating layer; an interlayer insulating film that covers the TFTs; a reflective pixel electrode connected to the drain of the corresponding TFT via an electrode; a transparent electrode provided over the reflective pixel electrode so that the two electrodes face each other, and a liquid crystal sealed between the two electrodes.

In operation, a read light incident into the transparent electrode is modulated by light modulation in accordance with a video signal provided from the TFT, reflected by the reflective pixel electrode and emitted from the transparent electrode for image display.

Formed on the reflective pixel electrode and the opposing transparent electrode are a pair of alignment films by which the liquid crystal is oriented.

The reflective pixel electrode is mostly made of a material exhibiting high reflectivity, such as, aluminum or silver. In contrast, the opposing transparent electrode is mostly made of a transparent and conductive material, such as, an indium tin oxide (ITO) film. These materials for the two opposing electrodes exhibit different work functions.

The different work functions cause difference in contact potential difference between contact potential appearing across the reflective pixel electrode and its corresponding alignment film and that appearing across the transparent electrode and the other alignment film.

The contact potential difference further causes D.C. components to be applied to the liquid crystal, which results in flicker on displayed images or screen burn-in due to segregation of ionized impurities generated from the liquid crystal when the same image is displayed for a long time, thus giving adverse effects to image quality.

It is a known fact, in reflective liquid crystal displays, that difference in work function between a reflective pixel electrode and an opposing transparent electrode within ±2% causes little flicker and screen burn-in.

Japanese Unexamined Patent publication No. 2002-365664 discloses a reflective liquid crystal display based on this fact.

This known liquid crystal display is equipped with: a multiple number of TFTs formed on a glass substrate; a flattening film that covers the TFTs; a reflective pixel electrode, made of aluminum or silver, formed on the flattening film and connected to the drain of the corresponding TFT via a contact hole; an ITO-made transparent electrode provided over the reflective pixel electrode so that the two electrodes face each other; an ITO-made transparent pixel electrode provided on the reflective pixel electrode so that the transparent pixel electrode faces the transparent electrode; a pair of alignment films formed on the transparent electrode and the transparent pixel electrode; and a liquid crystal sealed between the alignment films.

It is disclosed that polarization on the interface between the transparent pixel electrode and its corresponding alignment film and that on the interface between the transparent electrode and the other alignment film are equal to each other so that no D.C. components are applied to the liquid crystal, which offers high image quality with very little flicker.

The known liquid crystal display disclosed in Japanese Unexamined Patent publication No. 2002-365664, however, has the following problems:

As illustrated in FIG. 1, when light is incident in a transparent electrode 26, a light component reflected by a reflective pixel electrode 27 and that reflected by a transparent pixel electrode 28 formed on the electrode 27 interfere with each other. This is because the material for the reflective pixel electrode 27 is aluminum or silver that exhibits high reflectivity but refraction index different from ITO.

The interference causes decrease in reflected light emitted from the transparent electrode 26. In other words, a bright image is displayed when a positive peak level of the light component reflected by the reflective pixel electrode 27 and that of the light component reflected by the transparent pixel electrode 28 are superposed on one another whereas a dark image is displayed when negative peak levels of these light components are superposed on one another.

SUMMARY OF THE INVENTION

A purpose of the present invention is to provide a reflective liquid crystal display that offers bright images with little flicker and screen burn-in and a method of assembling the reflective liquid crystal display.

The present invention provides a reflective liquid crystal display comprising: a transparent electrode; a reflective pixel electrode provided as facing the transparent electrode with a gap; a liquid crystal layer provided in the gap between the transparent electrode and the reflective pixel electrode; and a work-function adjusting layer provided in the gap and on the reflective pixel electrode, an entire work function of the work-function adjusting layer and the reflective pixel electrode being adjusted within ±2% of a work function of the transparent electrode.

Moreover, the present invention provides a reflective liquid crystal display comprising: a reflective pixel electrode; a liquid crystal layer provided over the reflective pixel electrode; and a transparent electrode provided as facing the reflective pixel electrode with a gap, the liquid crystal layer being interposed between the transparent electrode and the reflective pixel electrode, the transparent electrode being made of a material containing a specific metal so that a work function of the transparent electrode lies within ±2% of a work function of the reflective pixel electrode.

Furthermore, the present invention provides a method of assembling a reflective liquid crystal display comprising the steps of: forming a reflective pixel electrode on a first substrate; forming a transparent electrode on a second substrate; arranging the first and second substrates so that the reflective pixel electrode and the transparent electrode face each other with a gap; providing a liquid crystal layer in the gap between the transparent electrode and the reflective pixel electrode; forming a work-function adjusting layer in the gap and on the reflective pixel electrode; and adjusting an entire work function of the work-function adjusting layer and the reflective pixel electrode within ±2% of a work function of the transparent electrode.

Still furthermore, the present invention provides a method of assembling a reflective liquid crystal display comprising the steps of: forming a reflective pixel electrode on a first substrate; forming a transparent electrode made of a material containing a specific metal so that a work function of the transparent electrode lies within ±2% of a work function of the reflective pixel electrode, on a second substrate; arranging the first and second substrates so that the reflective pixel electrode and the transparent electrode face each other with a gap; and providing a liquid crystal layer in the gap between the transparent electrode and the reflective pixel electrode.

DETAILED DESCRIPTION OF PREFERRED EMBODIMENTS

Several embodiments according to the present invention will be disclosed with reference to the attached drawings.

Figure 1:
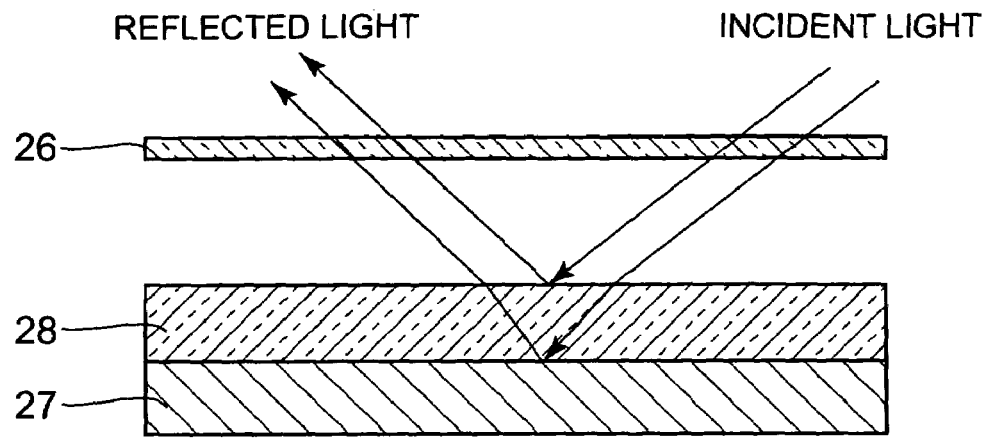
FIG. 1 is a schematic partial sectional view of a known reflective liquid crystal display, illustrating a problem of the known display.
Figure 2:
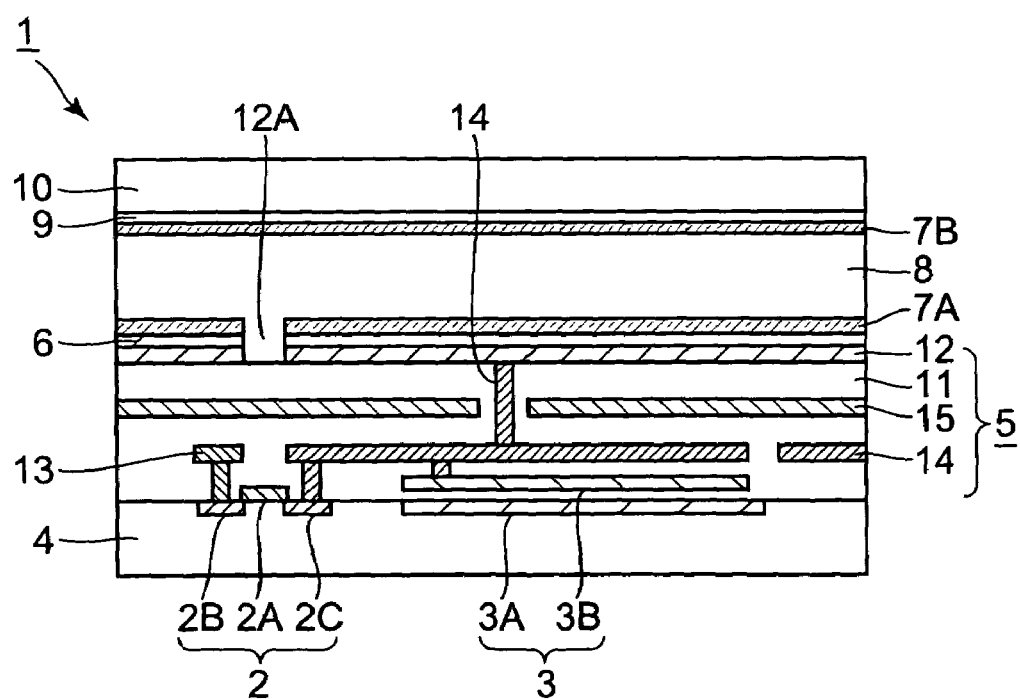
FIG. 2 is a schematic sectional view of a reflective liquid crystal display per pixel, as a first embodiment of the present invention.

FIG. 2 shows a cross section of a first embodiment of a reflective liquid crystal display per pixel according to the present invention.

In a reflective liquid crystal display 1 shown in FIG. 2, although only one pair of a switching transistor 2 and a capacitor 3 arranged in parallel (per pixel) is shown, a multiple number of such pairs are arranged in a matrix on a first substrate 4 made of silicon.

Laminated on the first substrate 4 in order are a reflective pixel-electrode multilayer 5, a work-function adjusting layer 6, a first $SiO_2$-made alignment film 7A, a liquid crystal layer 8, a second $SiO_2$-made alignment film 7B, and a second substrate 10 made of glass and having an ITO-made transparent electrode 9 formed thereon.

The switching transistor 2 consists of a gate 2A, a source 2B and a drain 2C formed on both sides of the gate 2A The capacitor 3 consists of a lower electrode 3A formed in the first substrate 4 by impurity diffusion and an upper electrode 3B formed over the lower electrode 3A via an $SiO_2$-made insulating layer 11.

The reflective pixel-electrode multilayer 5 consists of the insulating layer 11 and a reflective pixel electrode 12, made of aluminum or silver, formed on the insulating layer 11. Formed in the insulating layer 11 are: a signal wiring 13 connected to the source 2B of the switching transistor 2; a metal wiring layer 14 made of aluminum and connected to the drain 2C of the switching transistor 2, the upper electrode 3B of the capacitor 3 and further the reflective pixel electrode 12; and a light shielding layer 15, made of aluminum, that prevents light incident into a gap 12A of the reflective pixel electrode 12 from reaching the switching transistor 2.

The entire work function of the work-function adjusting layer 6 and the reflective pixel electrode 12 is in the range from 5.15 to 5.25 eV. The work function of the ITO-made transparent electrode 9 is in the range from 5.1 to 5.3 eV.

In detail, the entire work function of the work-function adjusting layer 6 and the reflective pixel electrode 12 is adjusted within ±2% of 5.2 eV, the center value in the work-function range for the transparent electrode 9.

A feasible material for the work-function adjusting layer 6 is nickel (work function: 5.2 eV), rhodium (work function: 5.0 eV), palladium (work function: 5.1 eV), platinum (work function: 5.7 eV) or an oxide of one of these materials.

The first and second alignment films 7A and 7B orient liquid crystal molecules of the liquid crystal layer 8.

In operation, light is incident from the second substrate 10 into the reflective pixel electrode 12 via the liquid crystal layer 8. It is then modulated by light modulation in accordance with a video signal supplied by the switching transistor 8. The modulated light is reflected by the reflective pixel electrode 12 and emitted from the second substrate 10 for image display. Charges generated in the liquid crystal layer 8 are stored in the capacitor 3.

Figure 3:
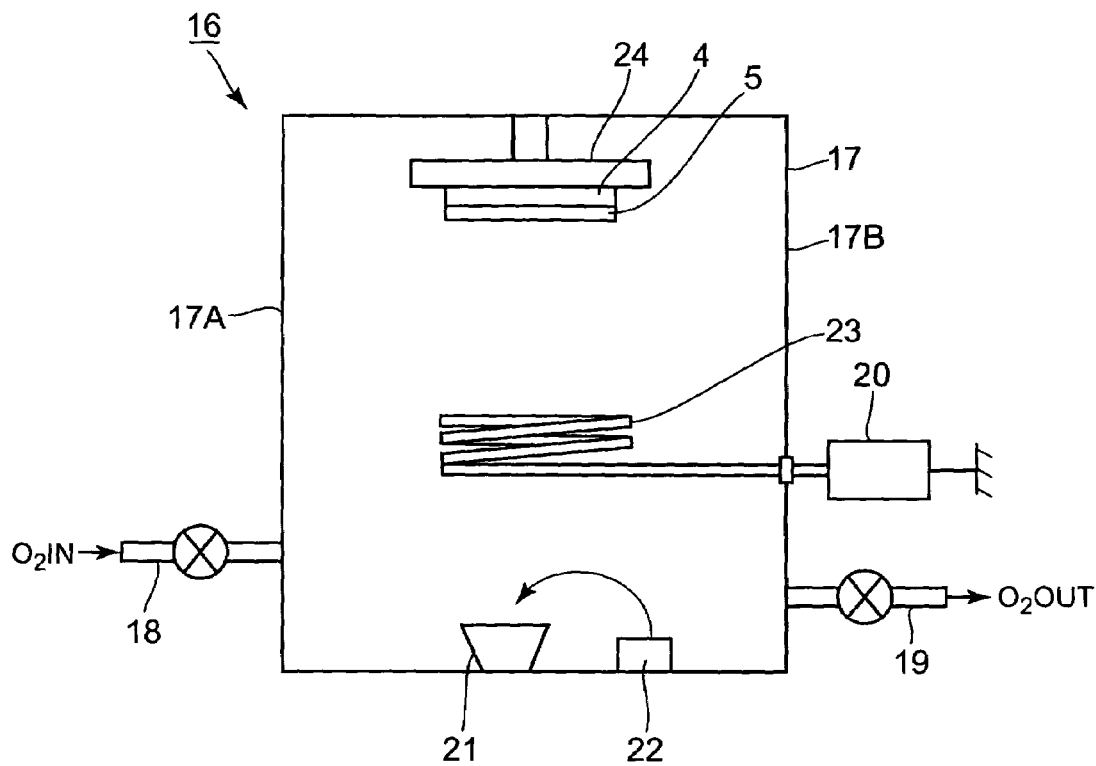
FIG. 3 is a schematic partial sectional view of a vacuum apparatus for forming a thin film on a substrate.

Disclosed next with reference to FIG. 3 is a method of forming the work-function adjusting layer 6, one of the features of the present invention.

Illustrated in FIG. 3 is a vacuum apparatus 16 to be used for forming the work-function adjusting layer 6. The vacuum apparatus 16 is equipped with: a hollow vacuum chamber 17; an inlet 18 penetrated into a side wall 17A of the vacuum chamber 17 and through which an $O_2$ gas is introduced; an outlet 19 penetrated into a side wall 17B of the vacuum chamber 17 and through which the $O_2$ gas is discharged; a high-frequency power source 20 provided outside the vacuum chamber 17; a boat 21 placed on the bottom of the vacuum chamber 17; an electron gun 22 for heating an electrical material stored in the boat 21 by electron heating; a high frequency coil 23, connected to the high-frequency power source 20 and provided above the boat 21, for exciting the $O_2$ gas to generate plasma in the vacuum chamber 17; and a substrate holder 24 provided over the high frequency coil 23 and fixed on the upper wall of the vacuum chamber 17.

Prepared first is the first substrate 4 having the reflective pixel-electrode multilayer 5 formed thereon. The first substrate 4 is held by the substrate holder 24 so that the multilayer 5 faces the high frequency coil 23. A work-function adjusting material is stored in the boat 21.

The vacuum chamber 17 is vacuumed and then the $O_2$ gas is introduced into the chamber 17 through the inlet 18. A high frequency output is fed to the high frequency coil 23 from the high frequency power source 20 to excite the $O_2$ gas to generate plasma in the vacuum chamber 17.

The electron gun 22 is activated to generate an electron beam. The electron beam is radiated to the work-function adjusting material stored in the boat 21 for sublimation. The sublimated material then passes through $O_2$ plasma and hence the work-function adjusting layer 6 is formed on the reflective pixel electrode 12 of the reflective pixel-electrode multilayer 5 on the first substrate 4.

The work-function adjusting layer 6 is formed on the reflective pixel electrode 12 by reactive deposition as follows:

The generated $O_2$ plasma is dissociated into positively ionized oxygen atoms and negative electrons. The electrons of high mobility are attracted into the high frequency coil 23 so that a negative potential appears inside the coil 23. In contrast, the positively ionized oxygen atoms of low mobility remain around the coil 23, thus a positive potential appears around the coil 23.

The negative and positive potentials inside and outside the high frequency coil 23, respectively, cause a potential difference between the substrate holder 24 and the outside of the coil 23. In other words, a negative potential appears on the holder 24 against the positive potential outside the coil 23.

The potential difference causes that the positively ionized oxygen atoms and the work-function adjusting material are attracted to the substrate holder 24, thus the work-function adjusting layer 6 being formed on the reflective pixel electrode 12.

The thickness of the work-function adjusting layer 6 can be adjusted in accordance with $O_2$-gas flow rate, temperature of the first substrate 4, high-frequency output, film forming rate, and film forming time.

Discussed below is evaluation of substrate samples 1, 2 and 3 each having the work-function adjusting layer 6.

The samples 1, 2 and 3 were assembled as having the work-function adjusting layer 6 made of nickel (the work function: 5.2 eV) and having the thickness in the range from 1 to 5 nm on the reflective pixel electrode 12 made of aluminum and having 200 nm in thickness over the first substrate 4.

The samples were assembled at 60 sccm in $O_2$-gas flow rate, 25° C. in temperature of the first substrate 4, 0.5 nm/sec in film forming rate, and 250 W in high-frequency output, while the film forming time was being varied from 2 to 10 sec.

Measured for each sample were the entire work function of the work-function adjusting layer 6 and the reflective pixel electrode 12, composition ratio (Ni/Al) and reflectivity.

The work function was measured for each sample by a photoelectron spectrometer AC-1 made by Riken Keiki Co., Ltd. The composition ratio was measured for each sample by an X-ray photoelectron spectrometer (XPS) made by ULVAC-PHI, Inc. The reflectivity was measured for each sample by a spectrophotometer made by Varian, Inc. The thickness was measured for each sample by a scanning electron microscope.

The measured work functions and composition ratios (Ni/Al) are shown in TABLE 1.

TABLE 1

|  | Sample 1 | Sample 2 | Sample 3 | Com Sample |
|---|---|---|---|---|
| Film Forming Time (sec) | 2 | 5 | 10 | 0 |
| Work Function (eV) | 5.08 | 5.22 | 5.30 | 4.3 |
| Composition Ratio Ni/Al (atomic %) | 0.2 | 0.6 | 1.6 | 0 |

The depth for XPS analysis is shallow in the range from about 7 to 8 nm from the sample surface. In XPS analysis, X-ray radiated onto the Ni-made work-function adjusting layer 6 reached the Al-made reflective pixel electrode 12 to measure average composition ratio (Ni/Al).

The work function in TABLE 1 indicates the average work function of the work-function adjusting layer 6 and the reflective pixel electrode 12. The measured work functions are 5.08 eV, 5.22 eV and 5.30 eV for the samples 1, 2 and 3, respectively.

The comparative sample (com sample) substrate was assembled with no work-function adjusting layer. Thus, the measured value 4.3 eV is the work function of the reflective pixel electrode 12.

The TABLE 1 shows that, as the film forming time is made longer from 2 sec., to 5 sec., and further to 10 sec., the composition ratio (Ni/Al) becomes higher and the entire (average) work function of the work-function adjusting layer 6 and the reflective pixel electrode 12 becomes gradually higher.

In particular, the entire work function is within ±2% of 5.2 eV, the center value in the work-function range for the ITO-made transparent electrode 9, for the samples 2 and 3. This teaches that a feasible film forming time is in the range from 5 to 10 sec.

Figure 4:
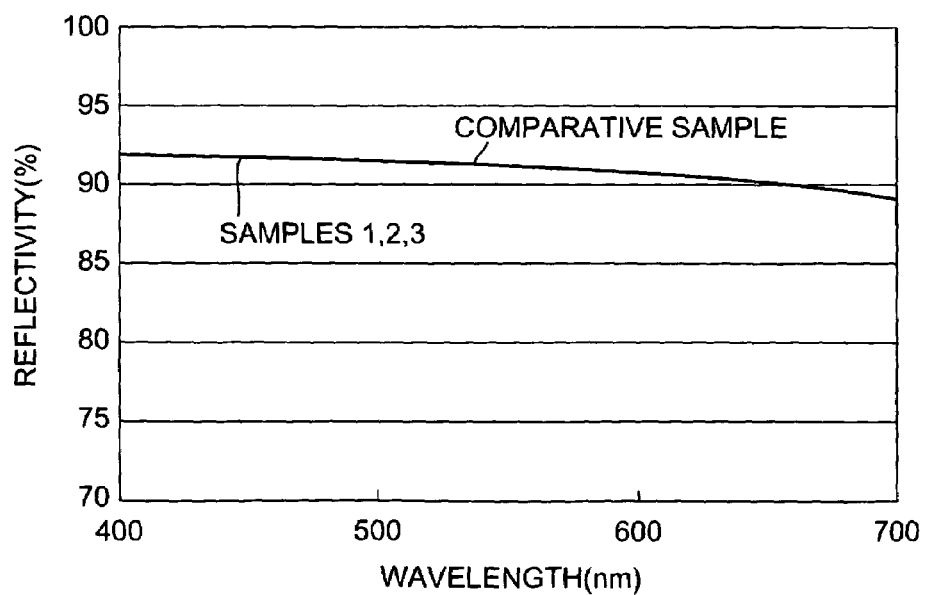
FIG. 4 is a graph indicating wavelength-dependent reflectivity of samples 1 to 3 having a reflective pixel electrode and a work-function adjusting layer formed thereon and a comparative sample having a reflective pixel electrode but no work-function adjusting layer formed thereon.

Evaluated next is wavelength-dependent reflectivity (percentage of reflectivity against incident light) as shown in FIG. 4 for the samples 1 to 3 and the comparative sample.

FIG. 4 indicates that all the samples having the Ni-made work-function adjusting layer 6 on the Al-made reflective pixel electrode 12 exhibited almost the same wavelength-dependent reflectivity as the comparative sample having the Al-made reflective pixel electrode 12 only. This teaches that the Ni-made work-function adjusting layer 6 causes almost no decrease in reflectivity.

Discussed next with reference to TABLE 2 is observation of flicker and screen burn-in on sample reflective crystal displays 4, 5 and 6, according to the first embodiment shown in FIG. 2, assembled as having the substrate samples 1, 2 and 3 discussed above, respectively, and the ITO-made transparent electrode 9.

Flicker and screen burn-in were also observed for a comparative sample (com sample) reflective crystal display assembled as having the comparative sample substrate discussed above and the ITO-made transparent electrode 9 (the other configuration of the comparative sample display being the same as shown in FIG. 2).

TABLE 2

|  | Sample 4 | Sample 5 | Sample 6 | Com Sample |
|---|---|---|---|---|
| Work Function (eV) | 5.08 | 5.22 | 5.31 | 4.3 |
| Flicker | little | no | little | much |
| Screen Burn-in | no | no | no | observed |
| Quality | good | good | good | no good |

The work functions 5.08 eV, 5.22 eV and 5.30 eV in TABLE 2 indicate the entire (average) work function of the work-function adjusting layer 6 and the reflective pixel electrode 12, for the sample displays 4, 5 and 6, respectively. The value 4.3 eV is the work function of the comparative sample display with no work-function adjusting layer formed.

Screen burn-in was examined by visual inspection on screen with no images displayed thereon after a still-image pattern had been displayed on each reflective liquid crystal display for 3 hours at 60° C. Flicker was examined by visual inspection while a still-image pattern was displayed on each display at 60° C.

When almost no flicker was observed, it is indicated as "no" in TABLE 2. When it was observed a little or very much, it is indicated as "little" or "much", respectively, in Table 2.

Screen burn-in is indicated as "observed" in TABLE 2 when the still-image pattern was still observed after termination of display.

The reflective liquid crystal displays with "no" and "little" on flicker were classified into "good" in quality whereas with "much" on flicker was classified into "no good" in quality.

The reflective liquid crystal displays with "no" on screen burn-in were classified into "good" in quality whereas with "observed" on screen burn-in was classified into "no good" in quality.

TABLE 2 indicates that the sample reflective liquid crystal displays 4, 5 and 6 were good whereas the comparative sample display was no good, in quality on flicker and screen burn-in.

Since the comparative sample reflective liquid crystal display was not provided with a work-function adjusting layer, there was a difference between contact potential appearing across the reflective pixel electrode 12 and the first alignment film 7A and that across the transparent electrode 9 and the second alignment film 7B. The contact potential difference caused D.C. components to be applied to the liquid crystal layer 8. The D.C. components might have caused flicker and screen burn-in.

As disclosed above, according to the first embodiment of the reflective liquid crystal display in this invention, the entire work function of the Ni-made work-function adjusting layer 6 and the Al-made reflective pixel electrode 12 is adjusted within ±2% of 5.2 eV, the center value in the work-function range for the ITO-made transparent electrode 9, thus high reflectivity being maintained for offering bright images with almost no flicker and screen burn-in.

Figure 5:
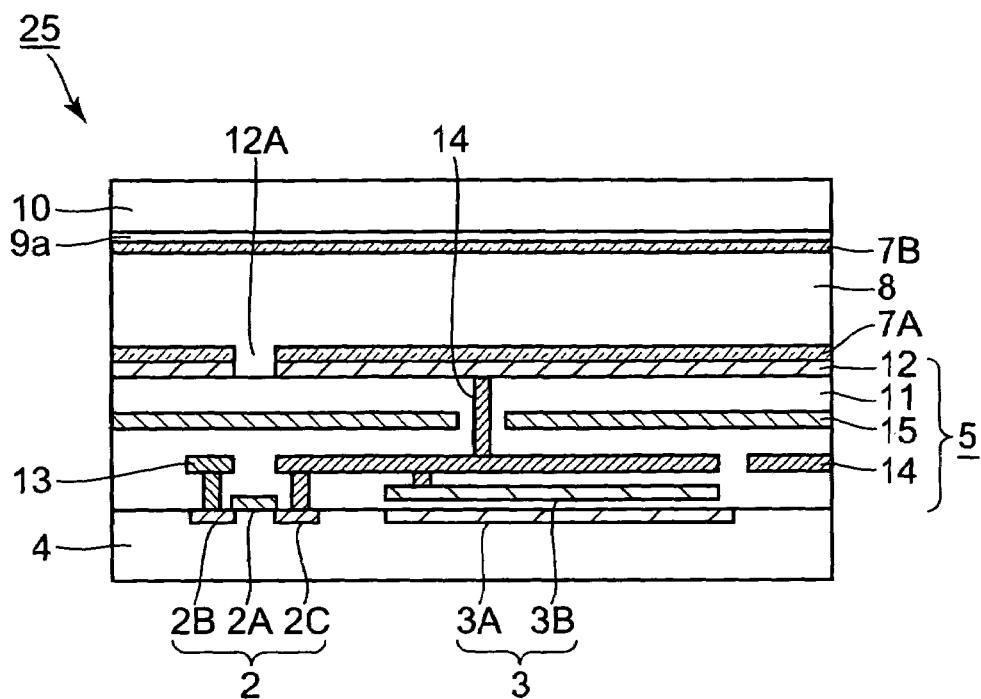
FIG. 5 is a schematic sectional view of a reflective liquid crystal display per pixel, as a second embodiment of the present invention.

FIG. 5 shows a cross section of a second embodiment of a reflective liquid crystal display per pixel according to the present invention. Elements shown in FIG. 5 the same as or analogous to those shown in FIG. 2 are given the same reference numerals and not explained.

The second embodiment is different from the first embodiment in that, in the second embodiment, the reflective pixel electrode 12 has no work-function adjusting layer thereon but an ITO-made transparent electrode 9a contains aluminum in the range from 2 to 10 weight %.

Substrate samples 7, 8 and 9 each having the ITO-made transparent electrode 9a containing aluminum in the range from 2 to 10 weight % were assembled by the vacuum apparatus 16 shown in FIG. 3.

In detail, the second substrate 10 was held by the substrate holder 24 so that the transparent electrode side faces the high frequency coil 23. The materials stored in the boat 21 were aluminum and ITO.

Like disclosed in the first embodiment, an electron beam was radiated from the electron gun 22 to the aluminum and ITO stored in the boat 21 to form the transparent electrode 9a on the second substrate 10, as having 50-nm thick ITO containing aluminum in the range from 2 to 10 weight %.

The samples 7, 8 and 9 were assembled at 20 sccm in $O_2$-gas flow rate, 300° C. in temperature of the second substrate 10, 5 nm/sec in film forming rate, and 250 W in high-frequency output.

The work function of the transparent electrode 9a having 50-nm thick ITO containing aluminum in the range from 2 to 10 weight % was measured for each sample, as shown in TABLE 3.

TABLE 3

| | Sample 7 | Sample 8 | Sample 9 | Com Sample |
|---|---|---|---|---|
| Al Content to ITO (weight %) | 2 | 5 | 10 | 0 |
| Al-add ITO Work Function (eV) | 4.78 | 4.35 | 4.22 | 5.18 |

The comparative sample (com sample) substrate was assembled with no aluminum contained in ITO. Thus, the measured value 5.18 eV is the work function of the transparent electrode made of ITO only.

TABLE 3 shows that, as the content of aluminum (Al) to ITO is increased, the work function of the transparent electrode 9a made of ITO containing aluminum is gradually decreased for the samples 7, 8 and 9. In particular, the work function is within ±2% of 4.3 eV (equal to that of the comparative sample in TABLE 1) of the reflective pixel electrode 12, for the samples 8 and 9.

It is understood from TABLE 3 that a feasible range of the content of aluminum to ITO is from 5 to 10 weight %.

Figure 6:
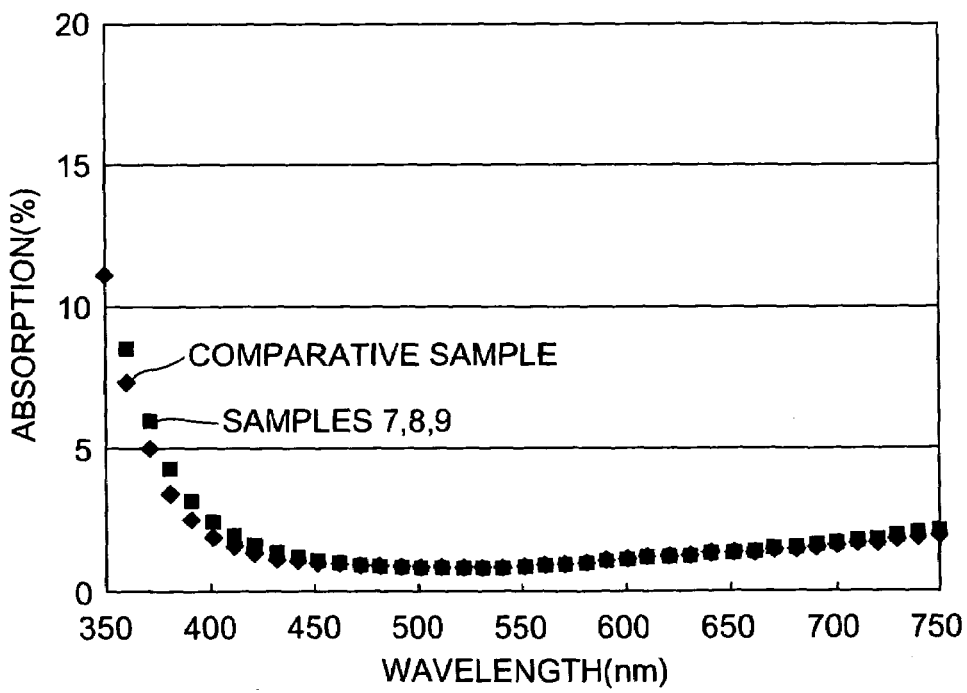
FIG. 6 is a graph indicating wavelength-dependent absorption of samples 7 to 9 having a transparent electrode made of ITO containing aluminum and a comparative sample having a transparent electrode made of ITO only.

Evaluated next is wavelength-dependent absorption (percentage of ratio of a difference value, a result value of subtraction of emitted light from incident light, to the incident light) as shown in FIG. 6 for the samples 7 to 9 and the comparative sample.

FIG. 6 indicates that all the samples having the transparent electrode 9a made of ITO containing aluminum exhibited almost the same wavelength-dependent absorption as the comparative sample having the transparent electrode made of ITO only. This teaches that the transparent electrode 9a made of ITO containing aluminum causes almost no decrease in absorption.

Discussed next with reference to TABLE 4 is observation of flicker and screen burn-in on sample reflective crystal displays 10, 11 and 12, according to the second embodiment shown in FIG. 5, assembled as having the substrate samples 7, 8 and 9 discussed above, respectively, and the Al-made reflective pixel electrode 12.

Flicker and screen burn-in were also observed for a comparative sample (com sample) reflective crystal display assembled as having the comparative sample substrate (TABLE 3) and the Al-made reflective pixel electrode 12 (the other configuration of the comparative sample display being the same as shown in FIG. 5).

TABLE 4

| | Sample 10 | Sample 11 | Sample 12 | Com Sample |
|---|---|---|---|---|
| Flicker | little | no | no | much |
| Screen Burn-in | no | no | no | observed |
| Quality | good | good | good | no good |

Flicker and screen burn-in were examined in the same as mentioned with reference to TABLE 2.

TABLE 4 indicates that the sample reflective liquid crystal displays 10, 11 and 12 were good whereas the comparative sample display was no good, in quality on flicker and screen burn-in.

As disclosed above, according to the second embodiment of the reflective liquid crystal display in this invention, the work function of the transparent electrode 9a is adjusted within ±2% of 4.3 eV, the work function of the Al-made reflective pixel electrode 12, by forming the transparent electrode 9a with ITO containing aluminum in range of 5 to 10 weight %, thus high reflectivity being maintained for offering bright images with almost no flicker and screen burn-in.

Moreover, aluminum and ITO can be prepared simultaneously in the vacuum apparatus 16 shown in FIG. 3 for the transparent electrode 9a, thus assembly of the second embodiment being easier than the first embodiment.

Furthermore, the present invention is applicable to several types of displays, such as, liquid crystal projectors and rear-projection liquid crystal displays.

What is claimed is:

1. A reflective liquid crystal display comprising:
   a transparent electrode;
   a reflective pixel electrode provided as facing the transparent electrode with a gap;
   a liquid crystal layer provided in the gap between the transparent electrode and the reflective pixel electrode; and
   a work-function adjusting layer provided directly on the reflective pixel electrode, an entire work function of the work-function adjusting layer and the reflective pixel electrode being adjusted within ±2% of a work function of the transparent electrode.

2. The reflective liquid crystal display according to claim 1 wherein the entire work function is an average of a work function of the work-function adjusting layer and a work function of the reflective pixel electrode.

3. The reflective liquid crystal display according to claim 1 wherein the transparent electrode includes indium tin oxide and the reflective pixel electrode includes aluminum.

4. The reflective liquid crystal display according to claim 3 wherein the work-function adjusting layer includes a material selected from the group consisting of nickel, rhodium, palladium and platinum.

5. The reflective liquid crystal display according to claim 3 wherein the work-function adjusting layer includes an oxide of a material selected from the group consisting of nickel, rhodium, palladium and platinum.

6. The reflective liquid crystal display according to claim 1 wherein the transparent electrode includes indium tin oxide and the reflective pixel electrode includes silver.

7. The reflective liquid crystal display according to claim 6 wherein the work-function adjusting layer includes a material selected from the group consisting of nickel, rhodium, palladium and platinum.

8. The reflective liquid crystal display according to claim 6 wherein the work-function adjusting layer includes an oxide of a material selected from the group consisting of nickel, rhodium, palladium and platinum.

9. A reflective liquid crystal display comprising:
   a reflective pixel electrode;
   a liquid crystal layer provided over the reflective pixel electrode; and
   a transparent electrode provided as facing the reflective pixel electrode with a gap, the liquid crystal layer being interposed between the transparent electrode and the reflective pixel electrode, the transparent electrode being made of a material containing a specific metal so that a work function of the transparent electrode lies within ±2% of a work function of the reflective pixel electrode, wherein the material is indium tin oxide and the metal is aluminum contained in the transparent electrode in a range from 5 to 10 weight % when the reflective pixel electrode is made of aluminum.

10. A reflective liquid crystal display comprising:
    a reflective pixel electrode;
    a liquid crystal layer provided over the reflective pixel electrode; and
    a transparent electrode provided as facing the reflective pixel electrode with a gap, the liquid crystal layer being interposed between the transparent electrode and the reflective pixel electrode, the transparent electrode being made of a material containing a specific metal so that a work function of the transparent electrode lies within ±2% of a work function of the reflective pixel electrode, wherein the specific material is indium tin oxide and the metal is aluminum contained in the transparent electrode in a range from 5 to 10 weight % when the reflective pixel electrode is made of silver.

11. A method of assembling a reflective liquid crystal display comprising the steps of:
    forming a reflective pixel electrode on a first substrate;
    forming a work-function adjusting layer directly on the reflective pixel electrode;
    forming a transparent electrode on a second substrate;
    arranging the first and second substrates so that the reflective pixel electrode having the work-function adjusting layer formed thereon and the transparent electrode face each other with a gap; and
    providing a liquid crystal layer in the gap between the transparent electrode and the reflective pixel electrode having the work-function adjusting layer formed thereon;
    wherein an entire work function of the work-function adjusting layer and the reflective pixel electrode is adjusted within ±2% of a work function of the transparent electrode.

12. A method of assembling a reflective liquid crystal display comprising the steps of:
    forming a reflective pixel electrode on a first substrate;
    forming a transparent electrode made of a material containing a specific metal so that a work function of the transparent electrode lies within ±2% of a work function of the reflective pixel electrode, on a second substrate;
    arranging the first and second substrates so that the reflective pixel electrode and the transparent electrode face each other with a gap; and
    providing a liquid crystal layer in the gap between the transparent electrode and the reflective pixel electrode;
    wherein the material is indium tin oxide and the metal is aluminum contained in the transparent electrode in a range from 5 to 10 weight % when the reflective pixel electrode is made of aluminum.

13. A method of assembling a reflective liquid crystal display comprising the steps of:
    forming a reflective pixel electrode on a first substrate;
    forming a transparent electrode made of a material containing a specific metal so that a work function of the transparent electrode lies within ±2% of a work function of the reflective pixel electrode, on a second substrate;
    arranging the first and second substrates so that the reflective pixel electrode and the transparent electrode face each other with a gap; and
    providing a liquid crystal layer in the gap between the transparent electrode and the reflective pixel electrode;
    wherein the material is indium tin oxide and the metal is aluminum contained in the transparent electrode in a range from 5 to 10 weight % when the reflective pixel electrode is made of silver.

* * * * *